(12) United States Patent
Martin et al.

(10) Patent No.: US 7,007,726 B1
(45) Date of Patent: Mar. 7, 2006

(54) COVER CLOSURE ASSEMBLY AND METHOD FOR FUEL TANK FILLER

(75) Inventors: Charles J. Martin, Dexter, MI (US); Carl F. Binder, Ann Arbor, MI (US)

(73) Assignee: Eaton Corporation, Cleveland, OH (US)

( * ) Notice: Subject to any disclaimer, the term of this patent is extended or adjusted under 35 U.S.C. 154(b) by 0 days.

(21) Appl. No.: 11/108,517

(22) Filed: Apr. 18, 2005

(51) Int. Cl.
*B65B 1/04* (2006.01)

(52) U.S. Cl. ............... 141/350; 141/301; 141/382; 220/86.2; 220/DIG. 33

(58) Field of Classification Search ............ 141/1, 141/2, 301, 346–352, 382; 220/86.2, DIG. 33
See application file for complete search history.

(56) References Cited

U.S. PATENT DOCUMENTS

| | | | |
|---|---|---|---|
| 2,145,758 A * | 1/1939 | Fellows et al. | 220/822 |
| 5,435,358 A * | 7/1995 | Kempka et al. | 141/312 |
| 5,732,842 A * | 3/1998 | Krause et al. | 220/254.1 |
| 6,009,920 A | 1/2000 | Palvoelgyi et al. | |
| 6,092,685 A | 7/2000 | Gruber | |
| 6,155,316 A | 12/2000 | Benjey | |
| 6,539,990 B1 * | 4/2003 | Levey et al. | 141/301 |

* cited by examiner

*Primary Examiner*—Timothy L. Maust
(74) *Attorney, Agent, or Firm*—Anna M. Shih

(57) ABSTRACT

A closure assembly and method for a capless fuel tank filler tube employs a housing with a flange adapted for mounting on a bulkhead having a nozzle size-discriminating and positioning aperture provided on the upper end of the filler tube. A sliding element in the housing has a nozzle opening offset from and normally closing the bulkhead aperture. Upon insertion of a refueling nozzle, a cam surface on sliding element causes the element to move to a position aligning the opening with the bulkhead aperture permitting the nozzle to be further inserted through the bulkhead. A projection on the sliding element may extend through a slot in the bulkhead for performing an auxiliary function such as releasing a flapper door latch.

10 Claims, 3 Drawing Sheets

COVER CLOSURE ASSEMBLY AND METHOD FOR FUEL TANK FILLER

BACKGROUND

Presently mandated requirements for controlling fuel vapor emissions in motor vehicle fuel tank systems require an onboard diagnostic (OBD) test be run periodically during the vehicle service life to determine whether the fuel system is vapor tight or whether fuel vapor is permeating to the atmosphere. Such OBD systems widely employ a sequence whereby a slight vacuum is drawn in the fuel tank and vapor emission control system and the rate of vacuum loss measured to determine whether a prohibitive amount of leakage is present in the system.

Vehicles equipped with such OBD systems have been found to experience widespread problems in service with leakage through the user removable fuel tank filler tube cap. The most common types of problems are improper placement of the fuel filler cap by the user after refueling and failure of the cap seal on the filler tube which is attributable to friction and wear after multiple refueling operations.

In order to provide a fuel tank filler system without the conventional user removable cap, it has been required to provide a fuel vapor tight seal mechanism in the filler tube to prevent fuel vapor emission to the atmosphere upon completion of refueling. Thus, a latchable flapper valve has been proposed and such an arrangement is shown and described in co-pending application Ser. No. 11/047,201 filed Jan. 31, 2005, Titled: "Door Latch For Capless Filler Neck", in the name of Paul D. Walkowski, et al., which describes such a releasable latch mechanism for the flapper door which application is assigned to the assignee of the present application. However, where such a releasable latching mechanism has been proposed for a fuel filler tube flapper valve, it has been desired to provide a permanently installed protective cover which will accommodate the insertion of a refueling nozzle without the need for a user removable cap.

Thus, it has been desired to find a way or means of providing for closing and sealing a fuel tank filler tube without the need for a user removable cap. It has further been desired to provide such a function in a manner which is easy to manufacture and install on the fuel tank filler tube, which is robust and reliable in service and sufficiently compact to fit in the limited space allotted for the filler tube in the vehicle body structure behind the outer fuel filler door.

BRIEF SUMMARY

The present specification, drawings and claims describe an exemplary embodiment and method for a solution to the above-described problem by providing a closure assembly fitted over the proximal end of the fuel tank filler tube bulkhead or partition which defines the nozzle-size discriminating aperture. The presently described embodiment of the solution employs a sliding member which is normally closed, but upon insertion of the nozzle, has a cam which causes the sliding member to move to a position aligning a hole in the sliding member with the nozzle aperture to permit further insertion of the refueling nozzle. The sliding member includes a projection which is operable upon nozzle insertion and movement to perform an auxiliary function such as releasing a latch or lock for the flapper door which seals the proximal end of the fuel filler tube when refueling is completed. Upon withdrawal of the refueling nozzle, the sliding member returns to its position closing the nozzle receiving aperture. The sliding member, cam and housing may be preassembled and installed as a unit over the bulkhead on the proximal end of the fuel filler tube.

DETAILED DESCRIPTION

Figure 1:
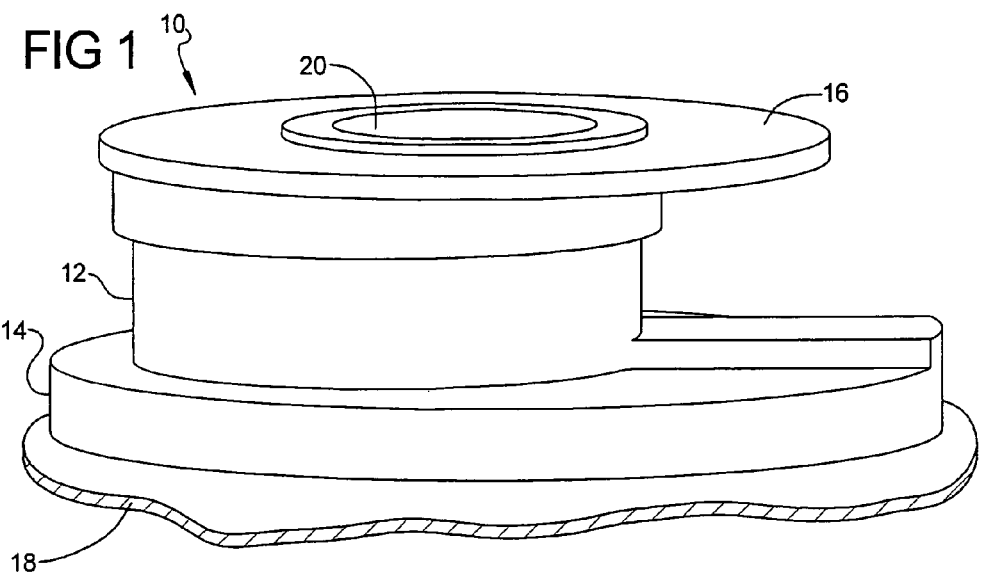
FIG. 1 is a perspective side view of an exemplary embodiment of the present closure assembly.
Figure 2:
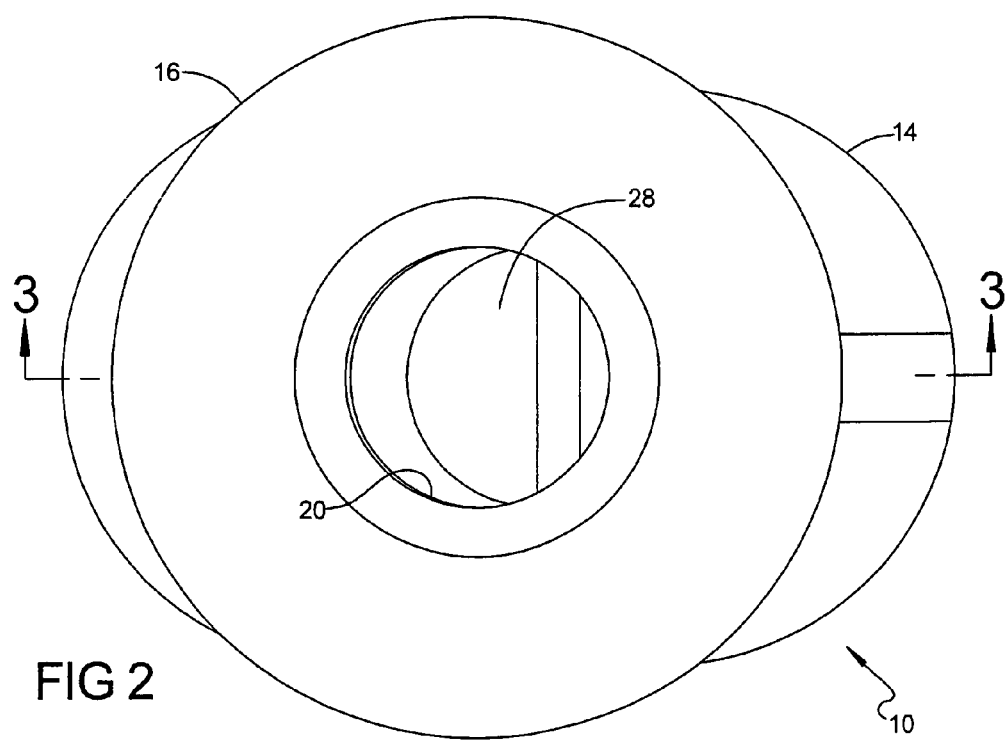
FIG. 2 is a top view of the assembly of FIG. 1.
Figure 3:
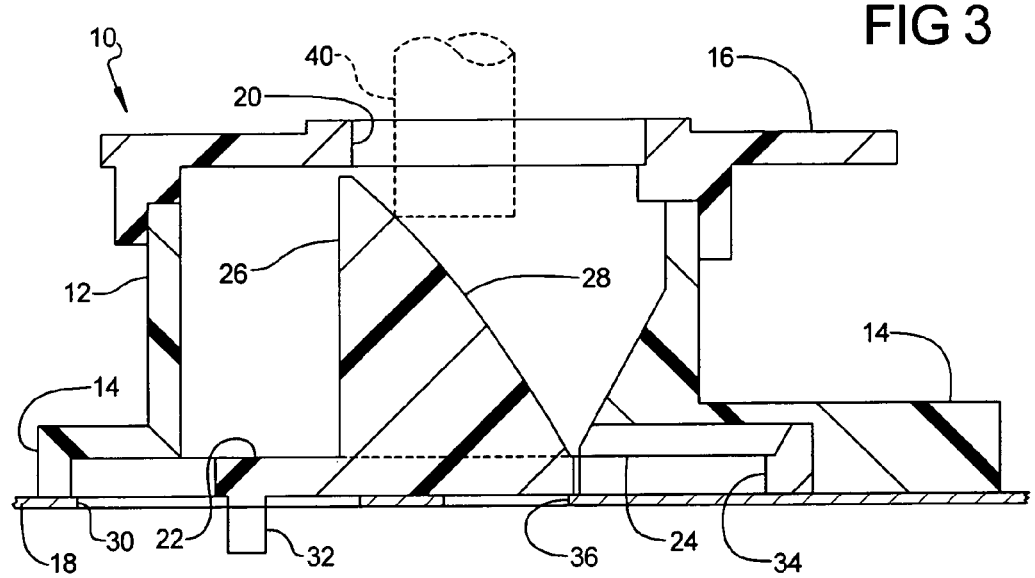
FIG. 3 is a section view taken along section indicating lines 3—3 of FIG. 2.

Referring to FIGS. 1, 2 and 3, an exemplary embodiment of the closure assembly is indicated generally at 10 and includes a housing 12 which has a lower mounting flange 14 extending peripherally thereabout and radially outwardly therefrom and an upper flange 16 which is adapted for interfitting with the access opening for the fuel filler door on the vehicle body structure.

The lower mounting flange 14 is adapted for and is shown in the drawings as mounted on a bulkhead or partition 18 which it will be understood is permanently attached transversely to the proximal end of the fuel tank filler tube (not shown) by any suitable technique, such as by weldment. In the present practice, the lower mounting flange 14 of the assembly 10 may be secured to the bulkhead 18 by any suitable expedient as, for example, fasteners (not shown) or by adhesive bonding. In the present practice the housing 12 is formed of a suitable structurally robust material.

In the present practice, the housing 12 with its lower flange 14 are formed integrally as one piece; and, the upper flange 16 is formed as a cap which is attached over the housing 12 and secured thereto. Flanged cap 16 is attached to the housing 12 by any suitable expedient such as adhesive bonding or weldment. The flange cap 16 has a nozzle receiving aperture 20 formed therein which is sized to provide a clearance for a fuel dispensing nozzle as will hereinafter be described.

A sliding member or element 22 is received in the housing and guided for sliding movement therein by a groove or recess 24 formed in the undersurface of flange 14. The sliding element 22 has a portion thereof extending upwardly into the housing 12 as denoted by reference numeral 26, which portion has provided thereon a cam surface 28 which is ramped or inclined to the direction of insertion of the nozzle through aperture 20.

Bulkhead 18 has a slot or access opening 30 formed therein through which extends a projection or lug 32 provided on the sliding element 22 and which extends downwardly therefrom through the slot 30. Projection 32 is operable to perform an auxiliary function such as, for example, release of a flapper door latch mechanism (not shown) upon movement of the sliding element.

The sliding element 22 has an opening or nozzle receiving hole 34 formed therein which in the position as shown in FIG. 3 is located offset from a nozzle receiving aperture 36 formed in the bulkhead 18 such that the aperture 36 is normally closed. The sliding element 26 is shown in this offset position in FIG. 3.

Figure 5:
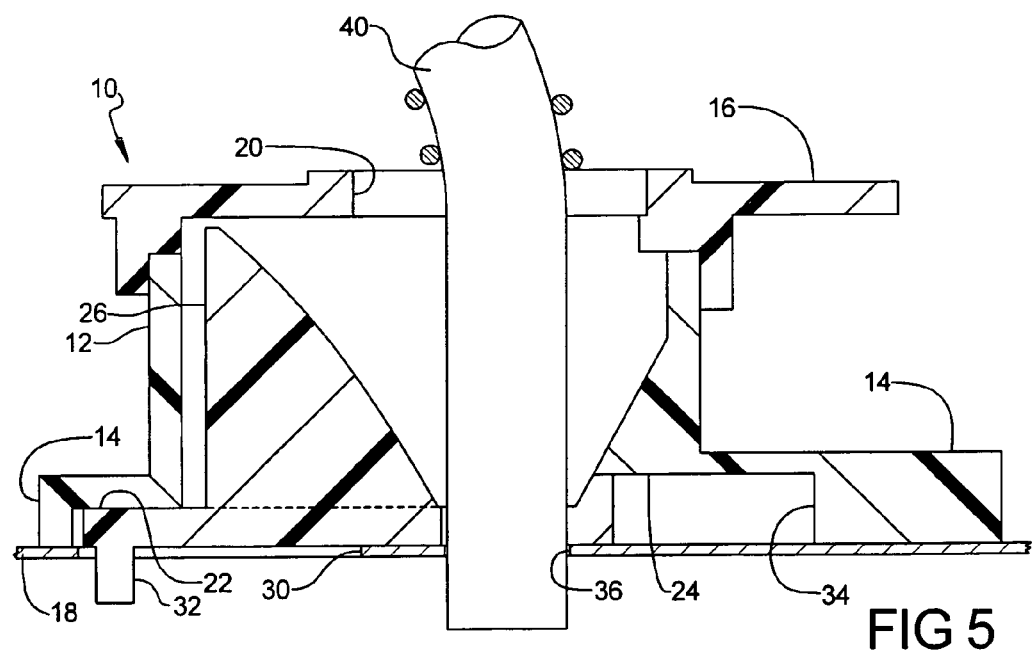
Figure 4:
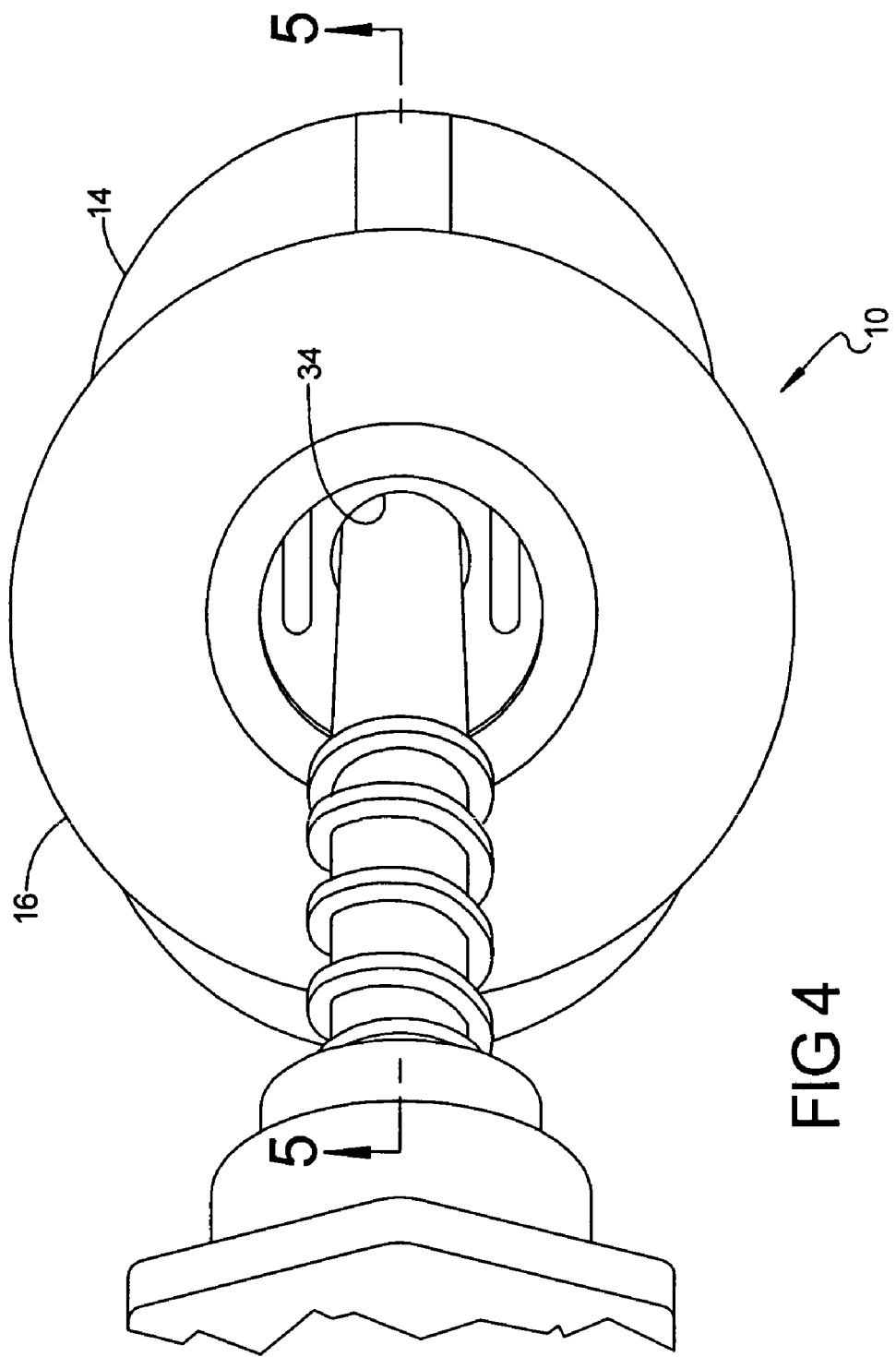
FIG. 4 is a view of the assembly of FIG. 1 with a refueling nozzle inserted therein; and, FIG. 5 is a section view taken along section indicating lines 5—5 of FIG. 4.

Referring to FIGS. 3, 4 and 5, a fuel dispensing nozzle 40 is shown in dashed outline initially inserted in the aperture 20 and as having acted on the cam surface 28 and moved the sliding element 22 to its leftward most or open position and the nozzle 40 fully inserted as shown in FIG. 5 in solid outline such that nozzle opening 34 is aligned with the aperture passed through the bulkhead and into the filler tube. As shown in FIG. 5, the projection 32 on the sliding element 22 has been moved to its leftward most or operative position and has thus performed an auxiliary function such as releasing a latch mechanism for a flapper door seal (not shown).

The present specification, drawings and claims have described an exemplary embodiment of a closure assembly for a capless fuel filler neck or tube which is operative upon insertion of a refueling nozzle to have the nozzle contact a cam surface and move a sliding element to align a nozzle receiving opening in the sliding element with a nozzle positioning aperture in the bulkhead or partition provided on the fuel filler tube. The sliding element includes a projection thereon operative for performing an auxiliary function such as releasing a flapper door seal latch mechanism.

The foregoing description is exemplary rather than defined by the limitations within. Many modifications and variations of the present invention are possible in light of the above teachings. The preferred embodiments of this invention have been disclosed, however, one of ordinary skill in the art would recognize that certain modifications would come within the scope of this invention. It is, therefore, to be understood that within the scope of the appended claims, the invention may be practiced otherwise than as specifically described. For that reason the following claims should be studied to determine the true scope and content of this invention.

What is claimed is:

1. A capless closure assembly for a fuel tank filler tube of the type receiving a fuel dispensing nozzle comprising:
   (a) a housing adapted for covering a bulkhead with a nozzle receiving opening disposed on the proximal end of the filler tube;
   (b) a closure member having a nozzle receiving aperture therein disposed on said housing and moveable between a first position aligning said aperture with said opening and a second position offsetting said aperture closing said opening; and,
   (c) a cam operable upon contact by user insertion of a nozzle in said housing to effect movement of said closure member from said second position to said first position such that said nozzle enters said opening in said bulkhead.

2. The assembly defined in claim 1, wherein said cam comprises a ramp surface formed on said sliding closure member.

3. The assembly defined in claim 1, wherein said sliding member includes a projection extending through said bulkhead for actuating a latch release.

4. The assembly defined in claim 1, wherein said housing includes a metal plate with said opening formed in said plate.

5. The assembly defined in claim 1, wherein said closure member is moveable in a direction transverse to the filler tube.

6. A method of caplessly closing a nozzle receiving filler tube for a fuel tank comprising:
   (a) disposing a housing on the nozzle receiving end of the filler tube and forming a nozzle receiving opening in the housing;
   (b) disposing a sliding element with a nozzle aperture on said housing, said element moveable between a first position aligning said aperture and said opening and a second position closing said opening;
   (c) disposing a cam in the path of nozzle insertion and upon insertion of said nozzle, contacting said cam with the nozzle and effecting movement of the element from said second to said first position and permitting the nozzle to enter said opening; and,
   (d) returning said element to said second position when said nozzle is withdrawn.

7. The method defined in claim 6, wherein the step of returning the sliding element includes biasing said element to the second position.

8. The method defined in claim 6, wherein the step of disposing a cam includes forming a ramp on said element.

9. The method defined in claim 6, wherein said step of disposing a sliding element includes disposing an element moveable in a direction transverse to the filler tube.

10. The method defined in claim 6, wherein said step of disposing an element includes disposing an element of material consisting essentially of polyamide fractionally filled with particulate glass.

* * * * *